July 3, 1951 — L. S. GREENMUN — 2,559,120
VENTILATING SYSTEM FOR VEHICLES
Filed Oct. 12, 1945 — 10 Sheets-Sheet 2

INVENTOR:
LEO S. GREENMUN
BY William Seler
ATTORNEY

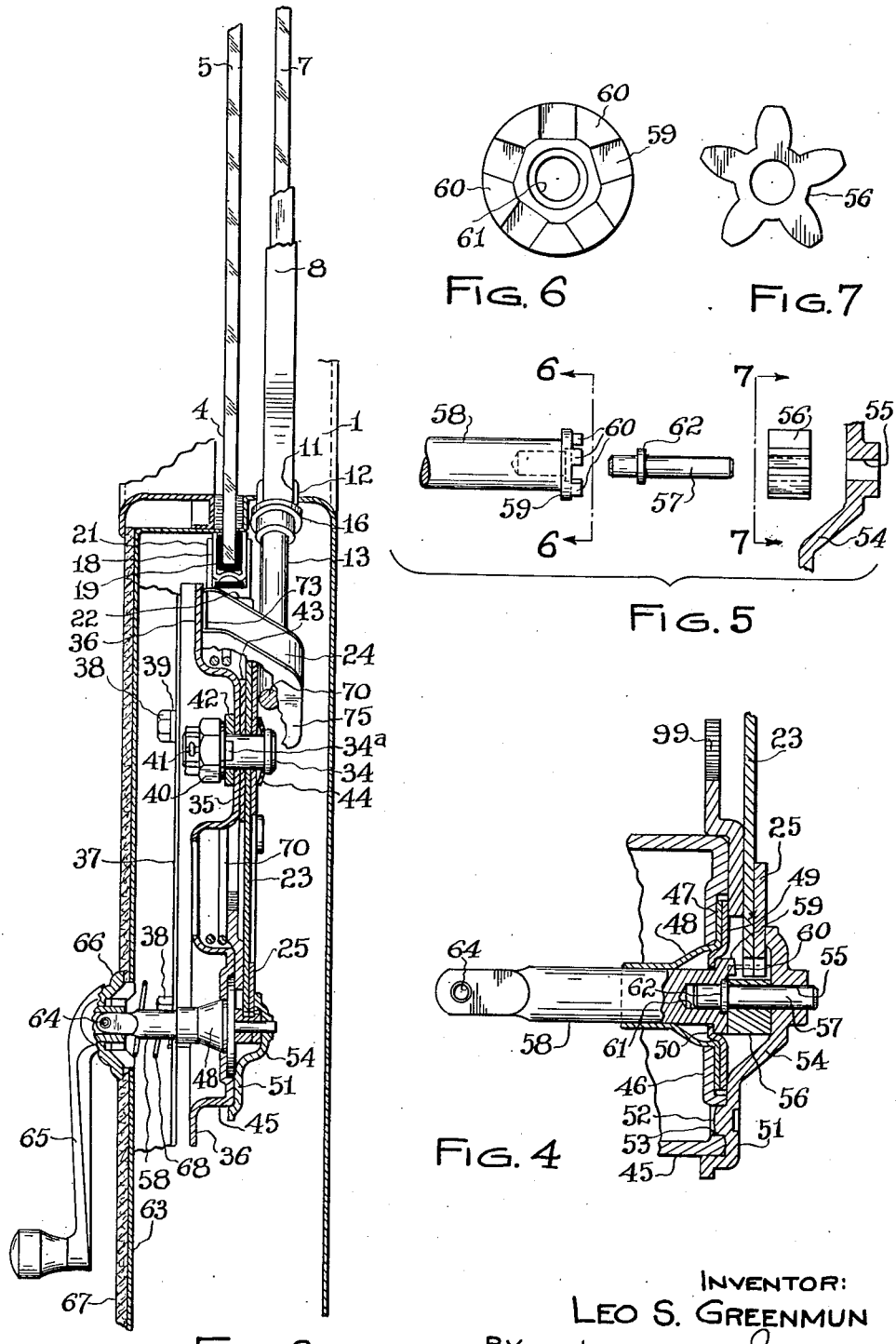

July 3, 1951 L. S. GREENMUN 2,559,120
VENTILATING SYSTEM FOR VEHICLES
Filed Oct. 12, 1945 10 Sheets-Sheet 4
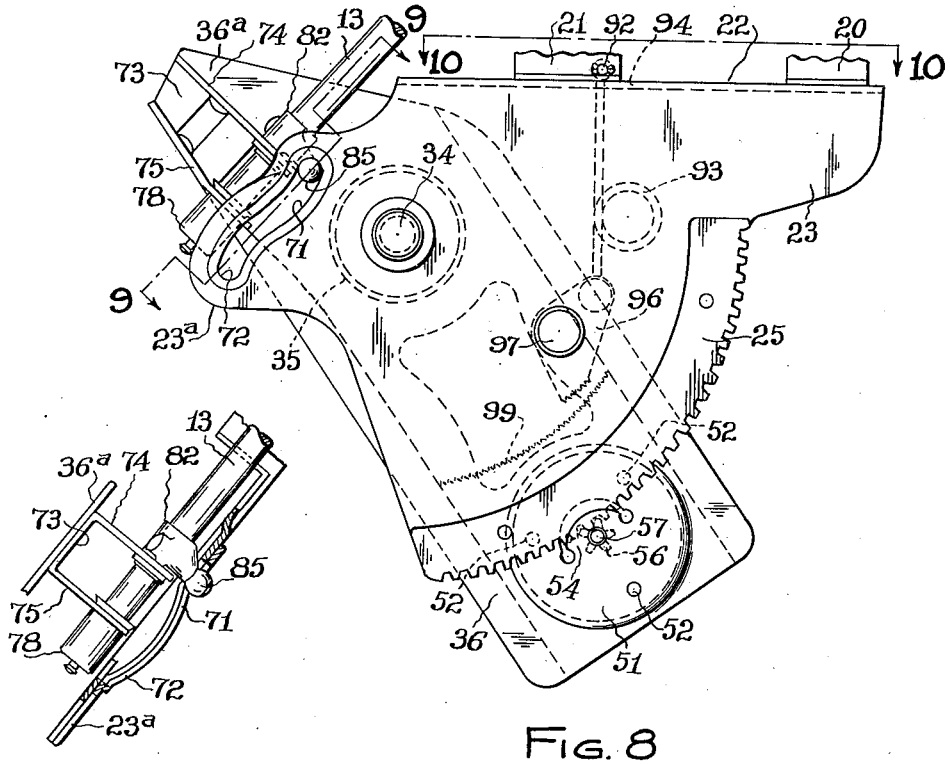
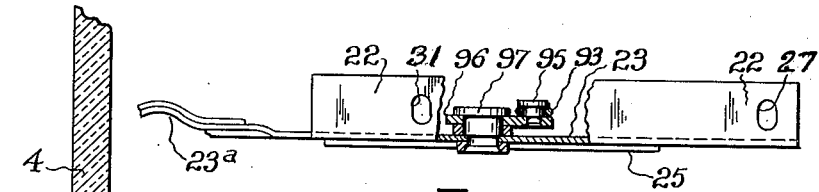
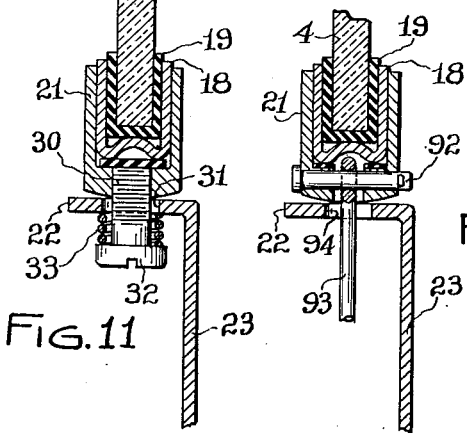
INVENTOR:
LEO S. GREENMUN
BY William Seler
ATTORNEY.

July 3, 1951          L. S. GREENMUN          2,559,120
VENTILATING SYSTEM FOR VEHICLES
Filed Oct. 12, 1945          10 Sheets-Sheet 5
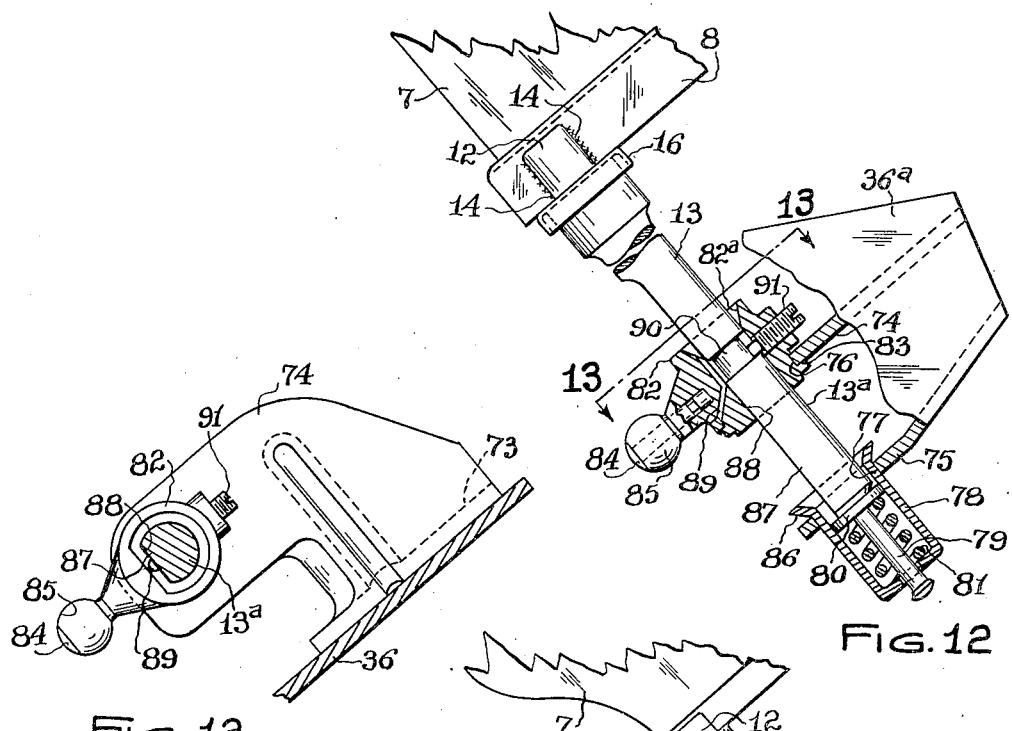
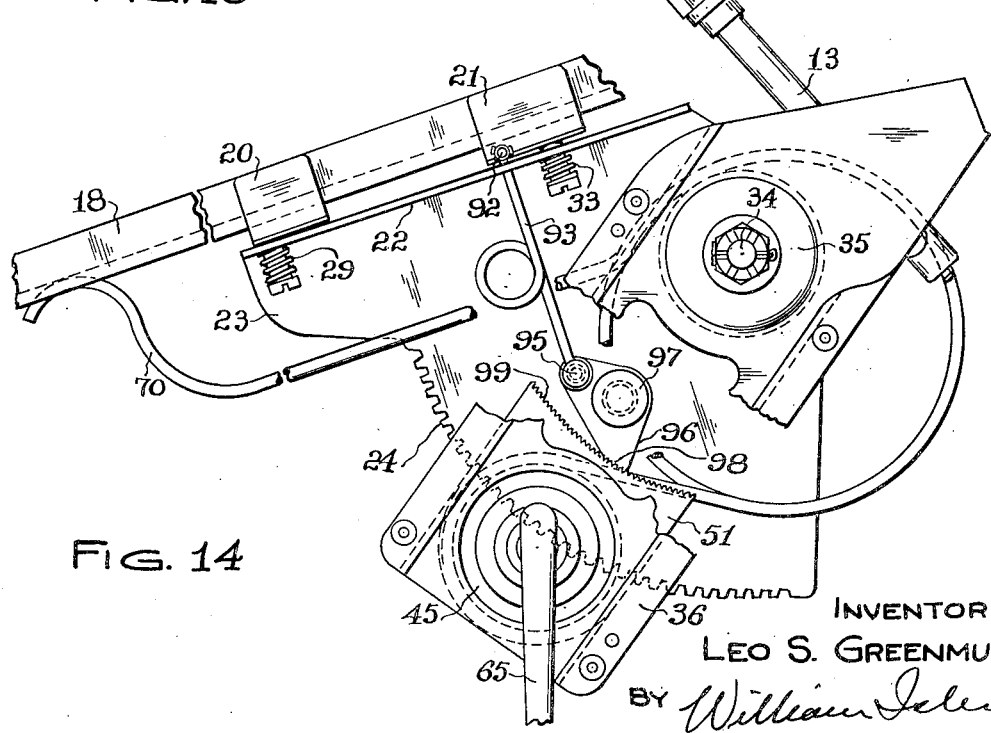
INVENTOR:
LEO S. GREENMUN
BY William Jelen
ATTORNEY.

July 3, 1951

L. S. GREENMUN 2,559,120

VENTILATING SYSTEM FOR VEHICLES

Filed Oct. 12, 1945

INVENTOR:
LEO S. GREENMUN
BY William Icle
ATTORNEY.

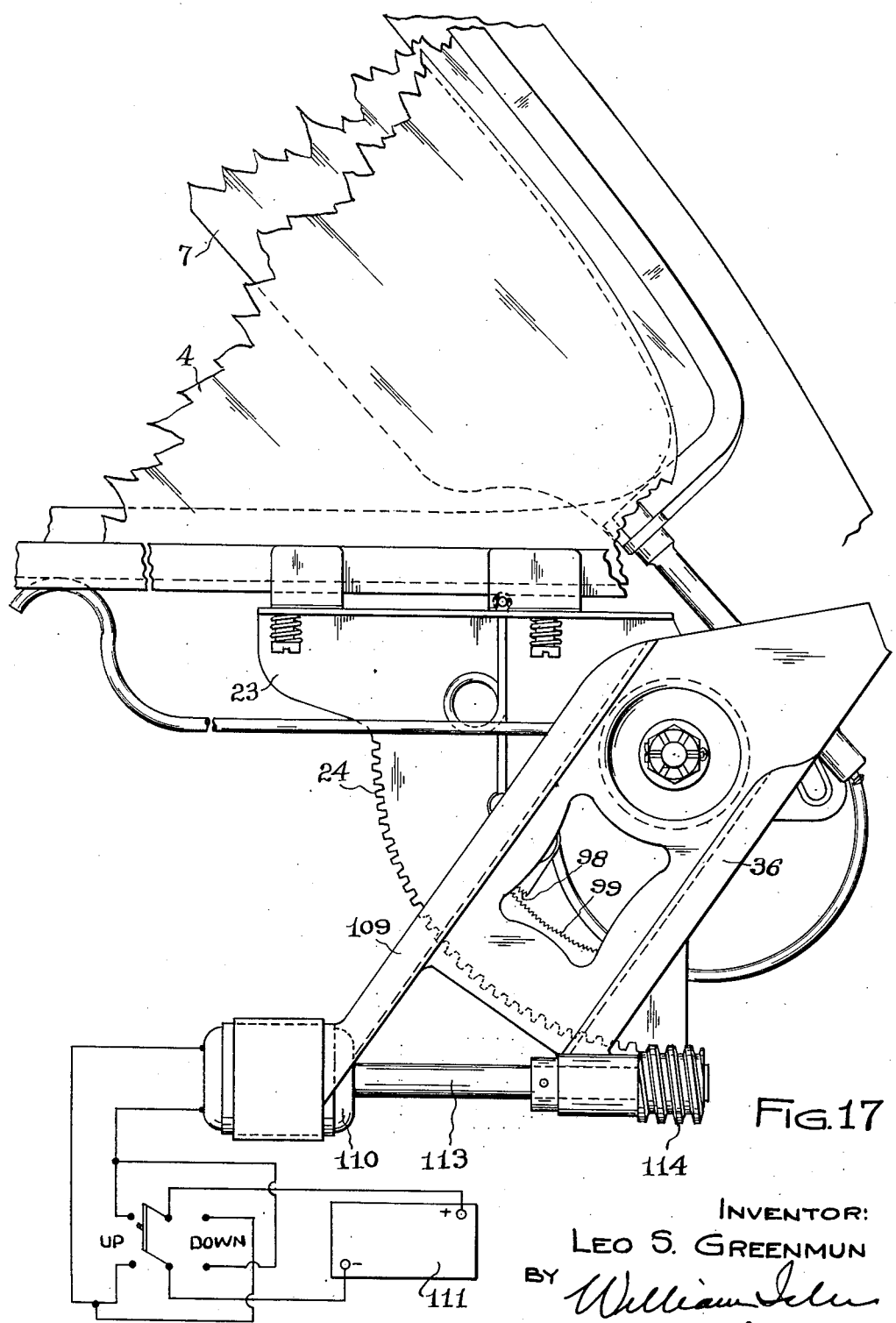

July 3, 1951 L. S. GREENMUN 2,559,120
VENTILATING SYSTEM FOR VEHICLES
Filed Oct. 12, 1945 10 Sheets-Sheet 8
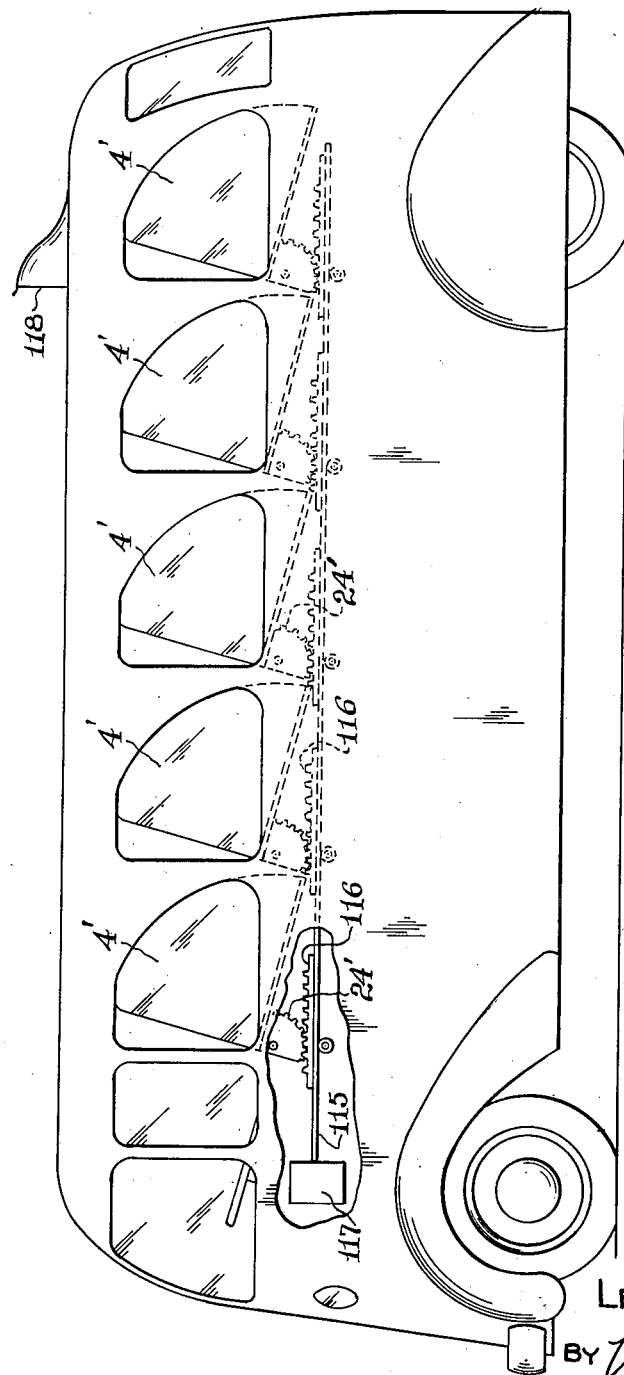
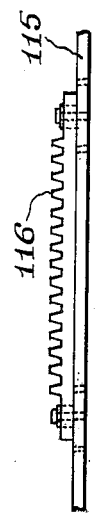
INVENTOR:
LEO. S. GREENMUN
BY William Iel
ATTORNEY INVENTOR:
LEO S. GREENMUN
BY William Isler
ATTORNEY.

July 3, 1951 L. S. GREENMUN 2,559,120
VENTILATING SYSTEM FOR VEHICLES
Filed Oct. 12, 1945 10 Sheets-Sheet 10
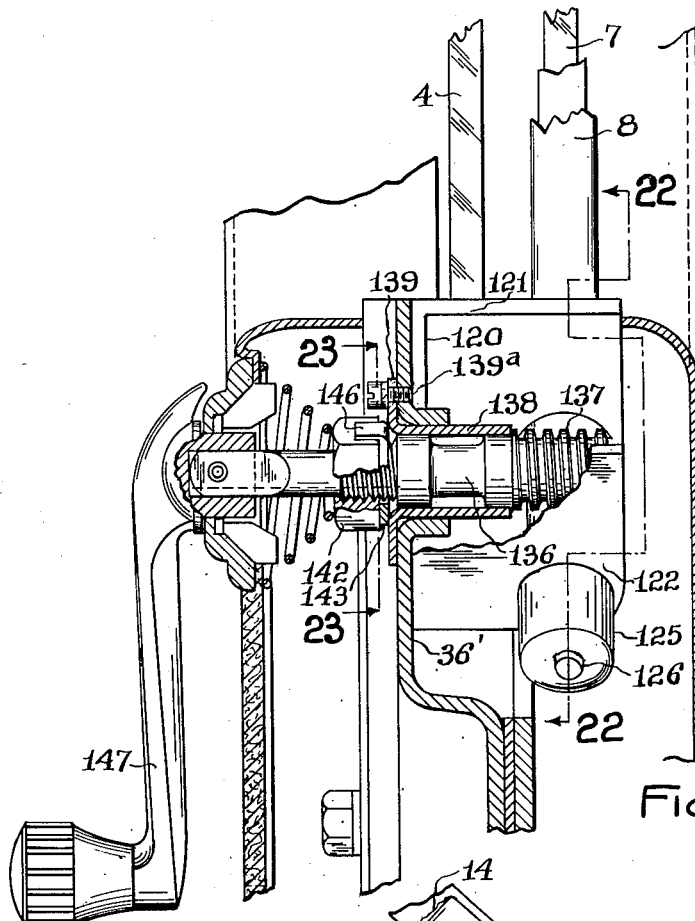
FIG. 21
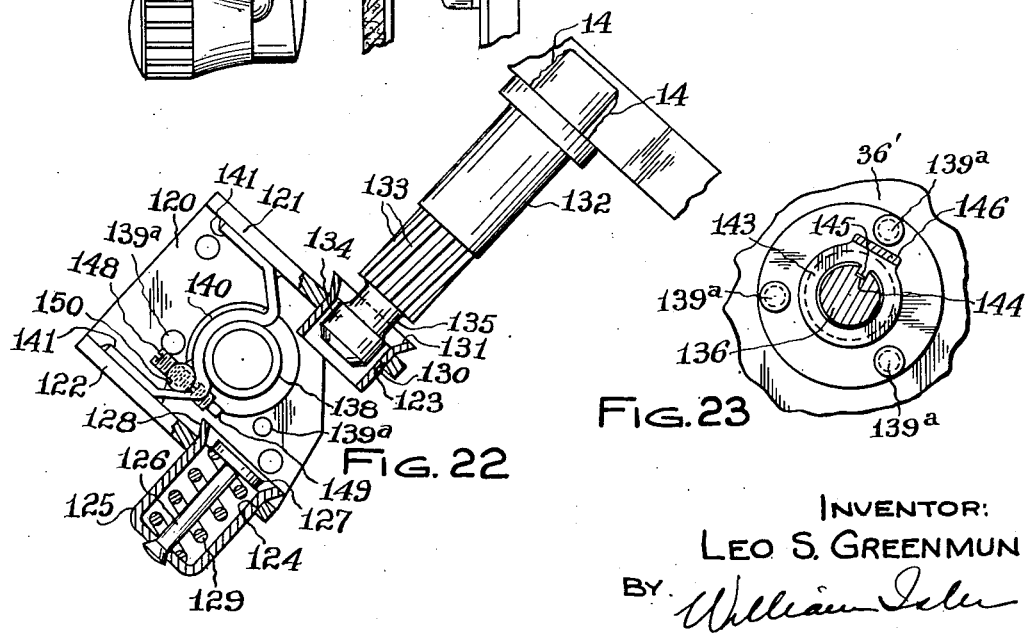
FIG. 22
FIG. 23
INVENTOR:
LEO S. GREENMUN
BY William Isler
ATTORNEY.

Patented July 3, 1951

2,559,120

UNITED STATES PATENT OFFICE 2,559,120

VENTILATING SYSTEM FOR VEHICLES

Leo S. Greenmun, Cleveland, Ohio

Application October 12, 1945, Serial No. 622,032

15 Claims. (Cl. 268—122)

This invention relates generally to ventilating systems for vehicles, but has reference more particularly to the ventilation of automobiles, busses and the like.

A primary object of the invention is to provide an arrangement of sliding and swinging window panels or units, particularly for automobile doors, as well as means for regulating or operating these in a predetermined sequence.

Another object of the invention is to provide means for preventing access to the interior of the automobile by unauthorized persons, by means of a direct downward push on the sliding window.

Another object of the invention is to provide means responsive to such a direct downward push on the sliding window for creating or emitting an alarm, to thereby warn bystanders that an effort is being made by unauthorized persons to gain access to the automobile.

Another object of the invention is to provide a novel gear drive for regulating the aforesaid windows or window units.

Another object of the invention is to provide power-actuated means for raising and lowering the sliding window.

A further object of the invention is to provide means for simultaneously regulating a series or battery of windows, as in a bus or similar vehicle.

A further object of the invention is to provide a novel means for mounting the swinging window on the automobile, whereby removal of the window unit for repair or replacement purposes is greatly facilitated.

A still further object of the invention is to provide novel means for mounting or supporting the sliding window, whereby said window may be subjected to lateral pressure or movement without damage or injury thereto.

Other objects and advantages of the invention will be apparent during the course of the following description.

In the accompanying drawings, forming a part of this specification, and in which like numerals are employed to designate like parts throughout the same, Fig. 1 is a fragmentary side elevational view of the left side door of an automobile, as viewed from the interior of the automobile, with portions broken away to more clearly show the operating mechanism for the sliding and swinging windows or window panels, and with both in fully closed position;

Fig. 3 is a cross-sectional view, taken on the line 3—3 of Fig. 2;

Fig. 4 is a fragmentary cross-sectional view, showing the gear segment operating mechanism for the window regulator;

Fig. 5 is an exploded view of some of the parts shown in Fig. 4;

Fig. 6 is an enlarged end view of the drive shaft for the window regulator as seen in the direction indicated by the line 6—6 of Fig. 5;

Fig. 7 is an enlarged elevational view of the pinion of the window regulator, as seen in the direction indicated by the line 7—7 of Fig. 5;

Fig. 8 is a fragmentary view of certain of the parts shown in Fig. 2, as viewed from the opposite or reverse side;

Fig. 9 is a fragmentary cross-sectional view, taken in the line 9—9 of Fig. 8;

Fig. 10 is a view, as indicated by the line 10—10 of Fig. 8, with portions broken away to show the mounting of certain of the window locking elements;

Fig. 11 is a fragmentary cross-sectional view, taken in the line 11—11 of Fig. 2;

Fig. 11a is a fragmentary cross-sectional view, taken on the line 11a—11a of Fig. 2;

Fig. 12 is a view similar to Fig. 2, but with portions broken away to more clearly show the mounting of the swinging window;

Fig. 13 is a cross-sectional view, taken on the line 13—13 of Fig. 12;

Fig. 14 is a view similar to Fig. 2, but with the sliding window slightly lowered and showing also the operation of the means for preventing unauthorized opening of this window;

Fig. 17 is a view similar to Fig. 2, but showing power means for opening and closing the windows;

Fig. 18 is a view of a modification of the invention in which power means are utilized for simultaneously opening or closing the sliding windows of a bus or similar vehicle;

Fig. 18a is a view, on an enlarged scale, showing the mounting of one of the window regulating racks shown in Fig. 18;

Fig. 21 is a view of certain of the operating parts of Fig. 19, as viewed from the right side of Fig. 19, with portions broken away to more clearly show the construction;

Fig. 22 is a fragmentary cross-sectional view, taken on the line 22—22 of Fig. 21, and Fig. 23 is a fragmentary cross-sectional view, taken on the line 23—23 of Fig. 21.

Figure 1:
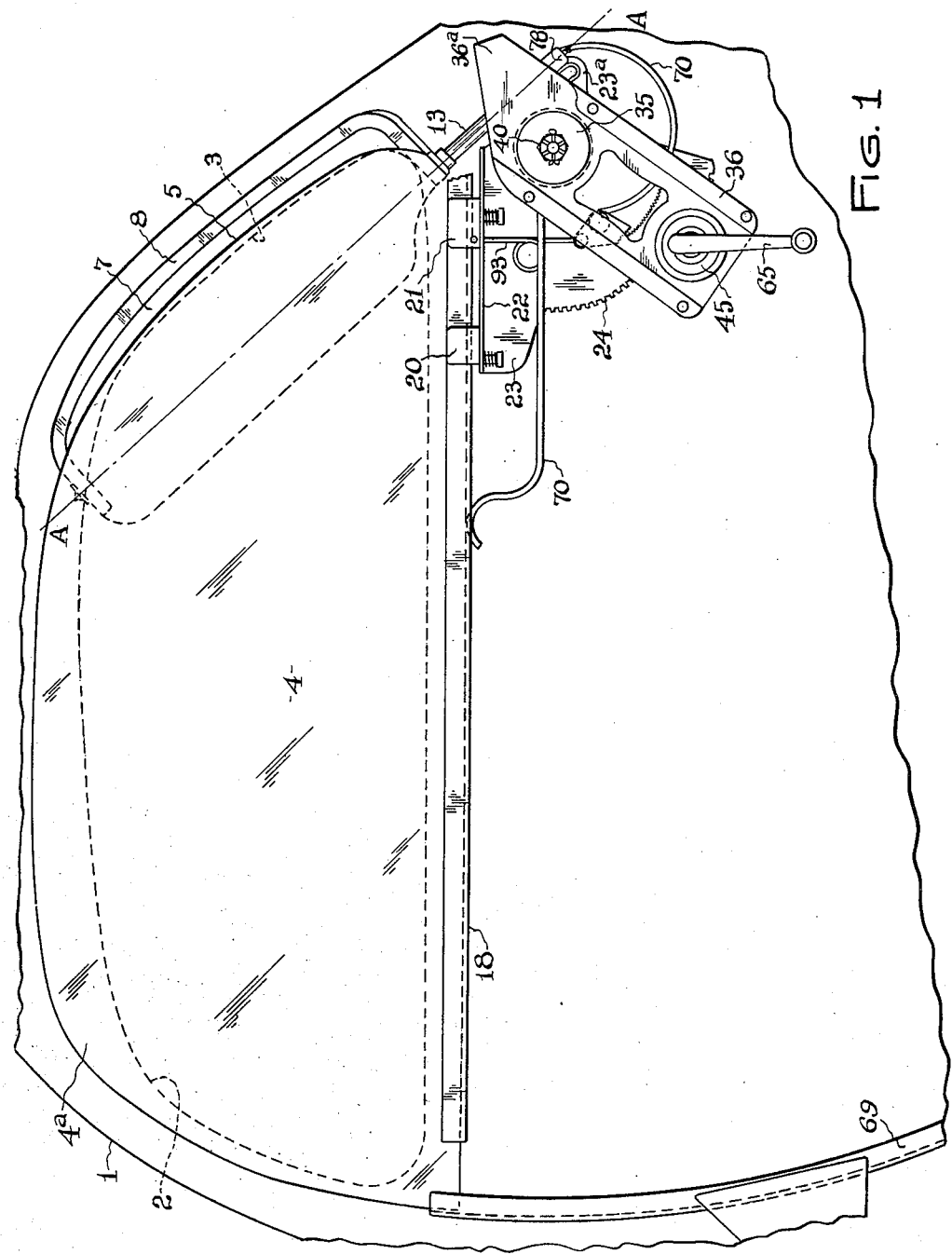

Referring more particularly to Figs. 1 to 14 inclusive of the drawings, there is illustrated, as viewed from the interior of the automobile, the left side door 1 of an automobile, the door being of more or less conventional form and construction and having a window opening 2, the front edge 3 of such opening sloping downwardly and forwardly, in accordance with conventional construction.

The door is provided with a sliding window 4, which, in outline, conforms generally with the shape of the window opening 2, and has a front edge 5 which is substantially parallel with the edge 3 of the window opening when the window is in fully closed position, the door frame being recessed for the reception of the edge 5 of the window. The window, it may be noted, fully closes the entire opening 2 of the window when in closed position, in contrast to conventional construction embodying a sliding window and a wing panel or shutter, which is swingable about a vertical or inclined axis, is relied upon to close the remainder or front portion of the window opening.

It may be further noted that the window 4 has an upper rear portion 4a which extends for a considerable distance above the adjacent edge of the window opening 2, when the window is in fully closed position. When the window 4 is to be opened or lowered, it is rotated about a horizontal axis, as will be presently described. In the initial stages of such opening movement, an opening of considerable area is formed between the front edge 5 of the window and the front edge 3 of the window opening 2 before an opening is formed between the portion 4a of the window and the adjacent portion of the opening 2. This permits ventilation of the automobile while maintaining the rear portion of the window closed; and is of considerable advantage during a rainstorm, when the occupants of the automobile, in the usual case, obtain ventilation only at the risk of being subjected or exposed to the rain, which enters through the ventilating opening. In the present case, there is an additional advantage, because, as will be presently explained, the swinging window or wing panel is maintained in closed position during the initial stages of the opening of the windows and thus prevents entry of rain into the ventilating opening formed between the front edge 5 of the window and the front edge 3 of the window opening 2.

Figures 19, 20:
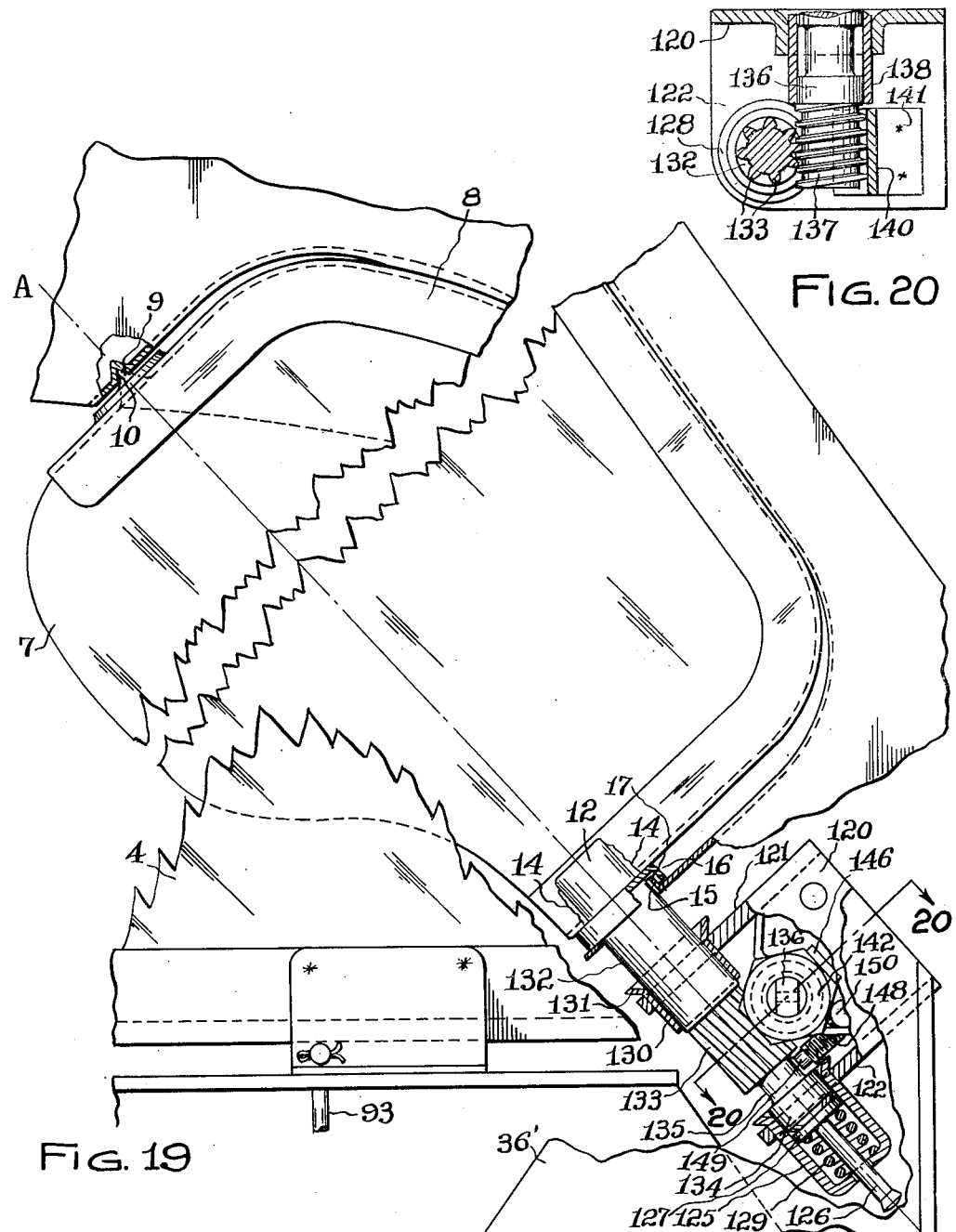
Fig. 19 is a view similar to Fig. 2, but showing a modification of the invention in which the swinging window or window panel is regulated independently of the sliding window.
Fig. 20 is a cross-sectional view, taken on the line 20—20 of Fig. 19.

In order to provide a desired type of no-draft ventilation for the automobile, a window or shutter 7 is provided, which extends substantially parallel with the edge 3 of the window opening 2, and is rigidly mounted in a U-shaped metallic frame 8 of channel-shaped cross-section. The window 7 is mounted on the door in such a manner as to be swingable about an up and down or inclined axis A—A (Figs. 1 and 19). The window 7, when in fully closed position, is disposed in a plane which is substantially parallel with the plane of the window 4, but spaced laterally and in an outboard direction from the latter plane. As best seen in Fig. 19, the web of the upper leg of the frame 8 is pressed outwardly to provide an embossment 9, which forms a pivot for entry into a conical seat 10 in the door frame.

The lower leg of the frame 8 is mounted in a slot 11 (Fig. 3) of the head 12 of a shaft or pin 13, the frame being permanently secured to the shaft by welding the frame to the head along the edges of the slot, as indicated at 14 in Figs. 12 and 19. The shaft 13 extends downwardly into an opening 15 (Fig. 19) provided therefor in the door frame, and for the purpose of providing a weather proof seal between the shaft and the point at which it enters the door frame, an inverted cup-shaped washer 16 is disposed about the head 12 of the shaft immediately below the frame 8, and is welded to the frame 8 or shaft head. The metal of the door frame is struck up about the shaft head to form a flange 17 of slightly smaller diameter than the flange of the washer 16, and the flange of the washer extends over the flange 17 to form a skirt for the latter, thereby providing a water-tight joint. The mounting of the frame 8 on the door is such that when the window 7 is in the fully open position and extends at about 90 degrees to the plane of the door, the window 7 may be moved sufficiently along the axis A—A to permit the window to be removed from the door, as will be presently explained.

The window 4 has its lower or bottom edge enclosed in a channel mounting 18, preferably made from a strip of cadmium-plated steel, a strip 19 of packing being interposed between the window and the mounting 18. Secured, as by spot welding to the forward portion of the channel mounting 18, and in spaced longitudinally-spaced relation to each other, are U-shaped clips 20 and 21, each of which is tranversely rounded at the bottom (Figs. 11 and 11a) for a purpose to be presently described.

The clips 20 and 21 are mounted on the horizontal flange 22 of a plate 23, a portion 24 of which is in the form of a segment of a gear, which is reinforced by means of an arcuate member 25 (Fig. 8) having gear teeth aligned with the teeth of the segment 24. The clip 20 is secured to the flange 22 by means of a screw 26 which extends through a transversely extending slot 27 (Fig. 10) in the flange 22 and into threaded engagement with the clip 20. The screw 26 has a head 28 between which and the flange 22 a compression spring 29 is interposed. The clip 21 is secured to the flange 22 by means of a screw 30 which extends through a transversely extending slot 31 (Figs. 10 and 11) in the flange 22 and into threaded engagement with the clip 21. The screw 30 has a head 32 between which and the flange 22 a compression spring 33 is interposed.

The aforesaid mounting of the clips 20 and 21 on the flange 22 permits the window 4 to rock laterally about its mounting on the flange 22, so as to compensate for out-of-square conditions and misalignment, as well as to resist breakage or damage in the event the window is accidentally pushed laterally to an undue extent. The slots 27 and 31 are sufficiently long to permit a slight degree of lateral movement of the window 4 to one side or the other, the flange 22 serving as a fulcrum during such movement for the rounded bottoms of the clips 20 and 21. Incidental to such tilting movement, the springs 29 and 33 are slightly compressed, but upon release of pressure upon the window, the springs restore the window to the normal vertical position shown in Figs. 11 and 11a.

The plate 23 is mounted for rotation about a pivot screw 34, which, as shown most clearly in Fig. 3, is mounted in the circular embossment 35 of a generally rectangular mounting plate 36. The plate 36 is rigidly secured to the door frame structure, indicated at 37, by means of screws 38 and lock washers 39. The mounting of the pivot screw 34 in the embossment 35 is effected by means of a castellated nut 40, which is locked to the pivot screw by means of a cotter pin 41. In order to prevent the pivot screw from turning in the embossment 35, the screw is provided with flat sides 34a, which sides are engaged by similarly flattened edges of a key washer 42, which is spot welded to the embossment 35. In order to create a desired degree of frictional resistance to the rotation of the plate 23, a friction washer 43, preferably made of sintered iron, is interposed between the plate 23 and the embossment 35, and a tension regulating washer 44 is interposed between the head of the screw 34 and the plate 23. It will be apparent that by adjusting the nut 40, the resistance of the plate 23 to pivotal movement about the screw 34 may be adjusted in a desired manner.

The plate 36 is also provided with a second circular embossment 45, which serves as a support for a gear drive or mechanism for rotating the plate 23, for the purpose of raising or lowering the window 4. For this purpose, the embossment 45, as best shown in Fig. 4, is provided with a central depressed portion 46 for the reception of the flange 47 of a shaft housing member 48, and the flange 49 of a retaining washer 50. The member 48 and washer 50 are maintained in position by means of a cap or mounting plate 51, in which a portion of the embossment 45 is nested. The plate 51 is rigidly secured to the embossment 45 as by spot welding, and, for the purpose of insuring that the plate 51 is properly located circumferentially with respect to the embossment 45, the plate 51 is provided with a plurality of circumferentially spaced locating pins 52 which extend into openings 53 provided therefor in the embossment 45. The plate 51 is provided with a portion which is struck or pressed outwardly therefrom to form a tongue 54 having an opening 55 which is in axial alignment with the housing member 48 and washer 50.

Disposed within the hollow space which is provided by the tongue 54 is a pinion 56 which is mounted for rotation about a pin 57, one end of which is mounted in the opening 55 in the tongue 54. The pinion 56 is in mesh with the teeth of the gear segment 24 and its reinforcement 25. Journalled in the drive shaft housing member 48 is a drive shaft 58 having an enlarged head 59 at one end provided with gear teeth 60 which extend axially of the drive shaft and into the spaces between the teeth of the pinion 56. The shaft 58 has an axial recess 61 in one end thereof in which one end of the pin 57 is mounted, the pin being provided with a radial flange 62 which is disposed between one end of the pinion 56 and the enlarged head 59 of the shaft 58, so that the pin is restrained against axial displacement relatively to these parts. The pinion 56 and the shaft 58 are retained in position by means of the tongue 54 and the washer 50, and it will be noted from Fig. 4 that the parts are so disposed as to present an extremely compact and unitary gear drive arrangement, which can be readily disassembled, if desired, for replacement of broken or worn parts.

The drive shaft 58 extends inwardly through the inner panel 63 of the door frame (Fig. 3), and has secured to its inner end, as by a pin 64, a crank handle 65. An escutcheon 66 is interposed between the handle 65 and the inner upholstered face 67 of the door. A tapered coil spring 68 is interposed between the panel 63 and the door frame structur 37. By turning the crank handle 65, which is accessible to the occupant of the automobile, the window 4 may be raised or lowered to any desired position through the intermediary of the aforesaid gear drive.

The window regulating mechanism which has been described forms a unit which is mounted on the door frame within the hollow space of such frame. By the use of the mechanism, the window 4 may be moved between the extreme closed position shown in Fig. 1 into the space within the lower hollow portion of the door 1. Throughout its downward movement, the window slides in a felt line arcuate channel 69 (Fig. 1) which is rigidly supported on the door frame, and is thus maintained against rattling at all times, and is protected against shock.

To facilitate movement of the window 4 to its various positions, a balance spring 70 is provided, which bears at one end on the embossment 45 of the plate 36 and engages the channel strip 18.

Means have also been provided for regulating both the window 4 and the window 7 by means of the crank handle 65, and in a predetermined sequence in which the sliding window is first partially opened without opening the swingable window, and both windows are then fully and simultaneosuly opened. Such means is best shown in Figs. 2, 8, 9, 12 and 13.

Referring to these figures, it will be seen that the plate 23 is provided with an extension 23a having therein a cam slot consisting of two connected arcuate portions 71 and 72 which are curved oppositely to each other. The function of this cam slot will be presently described. The plate 36 is also provided with an extension 36a at its upper end to the outboard face of which a follower bracket 73 is rigidly secured. This bracket is of U-shaped form, having ears 74 and 75 provided respectively with circular openings 76 and 77 which are in axial alignment with the axis of the shaft 13. Mounted in the opening 77 and having a push fit therein is a spring retainer cup 78 in which a pin 79 is mounted for reciprocal movement axially of the cup, the pin having an enlarged head 80 at its upper end. The pin is constantly urged in an upward direction by a compression coil spring 81 which is disposed within the cup and bears against the head 80 of the pin. Mounted in the opening 76 is a cam follower member 82, which is rotatable within said opening but is secured against displacement from the ear 74 by means of peening 83. The member 82 has mounted therein a pin 84 on which is journalled a ball cam 85.

The shaft 13 has a portion 13a which extends through the cam member 82 and into the cup 78, the cup having a flared lip 86 which facilitates entry of the shaft into the cup when the swingable window 7 is installed on the door. The member 82 has a similar flared opening 82a for this purpose. The shaft 13 bears against the head 80 of the pin 79 with sufficient pressure to compress the spring 81, so that the spring resiliently maintains the pivot 9 in its conical seat 10 (Fig. 19).

The portion 13a of the shaft has a flat face 87 which is in engagement with a flat face 88 of the member 82, so that rotation of the cam member 82 is directly communicated to the shaft 13 to rotate the latter. An oil groove 89 is provided in the flat face 88 of the member 82, through which oil or grease may be forced to the wall of the opening 76, for lubricating the latter, to facilitate rotation of the member 82.

For the purpose of preventing unauthorized removal of the window 7 from the door, the shaft 13 is provided with an annular recess 90 into which the dog point of a set screw 91 extends, the set screw thus maintaining the shaft 13 against axial movement sufficient to remove the window 7. When, for any reason, it is desired to remove the window 7 from the door, it is only necessary to withdraw the point of the set screw from the recess 90, open the window to its fully open position, depress the window against the spring-pressed head 80 of the pin 79 sufficiently to release the pivot 9 from the seat 10, and to then pull the window unit outwardly and upwardly, so as to draw the shaft 13 thereof out of the cup 78 and the member 82. Replacement of the window unit is effected by a reversal of these movements.

When the window 7 is in the fully closed position, as shown in Fig. 1, the ball cam 85 is disposed in the upper end of the portion 71 of the cam slot.

With the various parts, as thus described, and assuming that the windows 4 and 7 are in the fully closed position shown in Fig. 1, and that the occupant of the automobile wishes to partially or slightly open the window 4, but not the window 7, a condition which is desired during a rainstorm, for example, the operator will turn the crank handle 65, thereby rotating the plate 23 sufficiently to produce this condition, the movement of the plate continuing until the ball 85 reaches the junction of the portions 71 and 72 of the cam slot.

During this movement, the window 4 will be partially opened, but due to the shape of the portion 71 of the cam slot, no movement of the window 7 will take place until the cam ball 85 passes the junction between the portions 71 and 72 of the cam slot. In other words, during this movement of the plate 23, the ball 85 remains stationary.

Upon continued movement of the crank handle, the plate 23 continues to rotate, and the portion 72 of the cam slot in the plate 23 begins to act on the ball 85, and through the medium of the member 82, causes the shaft 13 to be rotated, thereby causing the window 7 to be opened, the extent of this movement being limited by the engagement of the ball 85 with the lower end of the portion 72 of the cam slot, the window 7, at this point, extending at an angle of approximately 90 degrees to the door. The window 4, in the course of this movement of the window 7, has been full opened, so that maximum ventilation of the automobile is effected.

It is to be particularly noted that the movements of the windows 4 and 7 are so synchronized that the window 4 is moved sufficiently to clear the rear edge of the window 7 as movement of the window 7 begins. This insures against breakage of either window or interference therebetween.

It is to be understood, of course, that the windows 4 and 7 may be opened to any position intermediate the fully closed and fully open positions, if desired.

Upon reversing the movement of the crank handle, the reverse of the aforesaid movements will be effected, that is to say, the window 7 will first be closed, and the window 4 nearly closed, after which the window 4 will be fully closed.

Means have also been founded for preventing or discouraging attempts to open the window 4 by a direct downward push upon the window, particularly by persons or individuals who have not been authorized to gain access to the interior of the automobile, such means being best shown in Figs. 1, 2, 8, 10, 11a and 14.

For this purpose, the clip 21 is provided with a pin 92, to which a lever 93 is pivotally secured, the lever extending downward, through an opening 94 in the flange 22 of the plate 23. The lower end of the lever 93 is pivotally secured, as by a pivot 95, to a trigger 96, which is mounted for pivotal movement about a pivot 97, which, in turn, is rigidly secured to the plate 23. The trigger 96 is provided with serrations or teeth 98, which are adapted for coaction with serrations or teeth 99 formed along the upper edge of the plate 51, which edge is concentric with the axis of the pivot screw 34.

Figure 2:
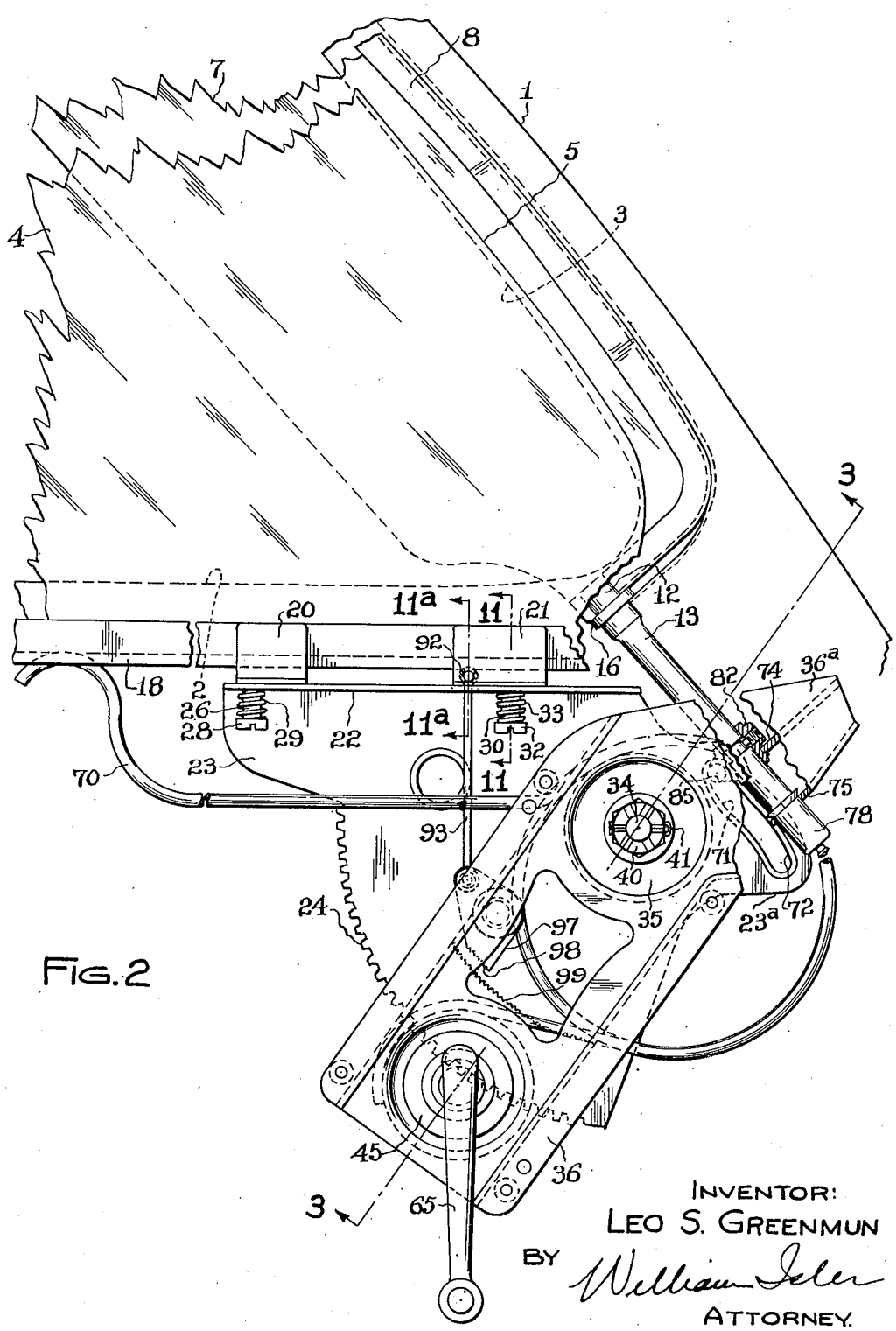
Fig. 2 is a view, on an enlarged scale, of a portion of Fig. 1.

When the window 4 is lowered in the normal way, as by rotating the crank 65, the trigger 97 remains in the relative position to the plate 51 which is shown in Figs. 1, 2, and 8, that is to say, the teeth of the trigger 97 remains out of contact with the teeth on the plate 51 and do not in any way interfere with the operation of the opening of the window. This is also true during closing of the window in the normal way.

When, however, an attempt is made to force the window 4 open by pressure applied downwardly against the upper edge of the window, the clip 20 will tend to rock in a counter-clockwise direction on the flange 22, as shown in Fig. 14, causing the springs 29 and 33 to be slightly compressed, the spring 33 being compressed to a greater extent than the spring 29. At the same time, the clip 21 is lifted away from the flange 22, as seen in Fig. 14, causing the pin 92 to exert an upward pull on the lever 93, which in turn, causes the trigger 96 to be rocked about the pivot 97, in a clockwise direction, to the position shown in Fig. 14. This brings the teeth 98 of the trigger into engagement with the teeth 99 on the plate 51, thereby effectively locking the window 4 against further downward movement. Upon release of pressure upon the window 4, the window mounting resumes its normal position, and the trigger 96 is moved from engagement with the teeth 99.

This locking action is facilitated by virtue of the friction which has been set up between the plate 23 and the plate 36, and which permits the rocking movement which has been described to be set up before such friction is overcome. The friction between the plates 23 and 36 is constant, being maintained through the use of the elements 34, 40, 41, 42, 43 and 44, which have been described.

Figure 15:
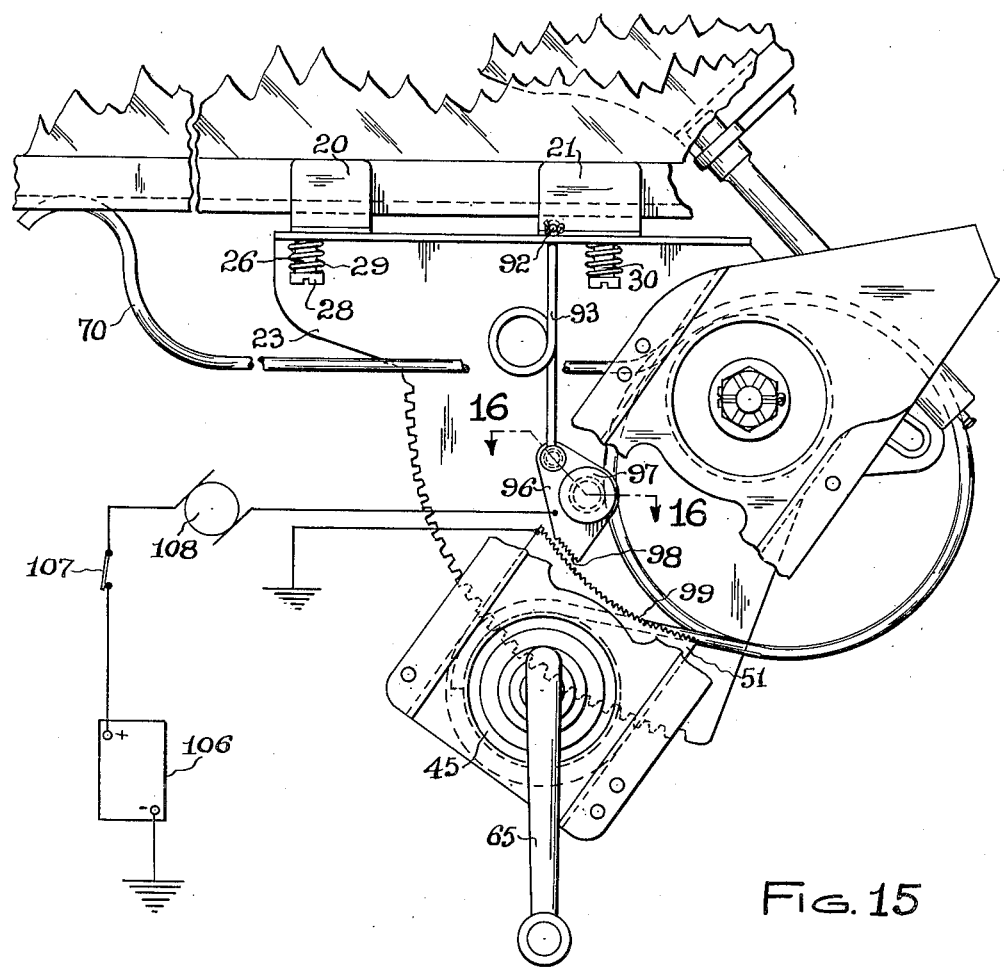
Fig. 15 is a view similar to Fig. 2, but showing a modification of the invention, in which means are provided for creating an audible signal in response to unauthorized attempts or efforts to open the sliding window.
Figure 16:
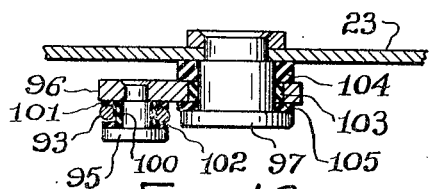
Fig. 16 is a fragmentary cross-sectional view, taken on the line 16—16 of Fig. 15.

In Figs. 15 and 16, I have shown a modification of the invention in which movement of the trigger of the window locking mechanism which has been described is utilized to close an electrical circuit which will sound an alarm, warning bystanders that an unauthorized individual is trying to gain access to the automobile.

For this purpose, the lever 93 is secured, as by the pivot 95, to the trigger 96, as shown in Fig. 16, but a bushing 100 of insulating material is interposed between the shank of the pivot 95 and the lever, a washer 101 of insulating material is interposed between the trigger and the lever, and a washer 102 is interposed between the head of the pivot 95 and the lever, to thereby completely electrically insulate the trigger from the lever.

Similarly, a bushing 103 of insulating is interposed between the shank of the pivot 97 and the wall of the opening in the trigger through which the pivot extends, a washer 104 of insulating material is interposed between the plate 23 and the trigger, and a washer 105 of insulating material is interposed between the head of the pivot 97 and the trigger, thereby completely electrically insulating the trigger from the pivot and the plate 23.

The alarm circuit, as shown in Fig. 15, comprises the grounded battery 106, which may be the ordinary 6-volt battery of the automobile, a manual cut-out switch 107, a horn or other sound-emitting device 108, the trigger 96, and the plate 51, which is grounded.

With the trigger in its normal position relatively to the plate 51, the aforesaid circuit is open. When, however, the window is pushed downwardly in the manner which has been described, and the teeth of the trigger are brought into engagement with the teeth on the plate 51, the aforesaid circuit is closed, and the alarm is sounded by the horn 108.

When the use of the alarm circuit is not desired, the circuit may be maintained open, as by means of the switch 107.

In Fig. 17, I have shown power-drive means for opening and closing the windows 4 and 7. For this purpose, the plate 36 is extended as at 109 to provide a support for a small fractional horsepower reversing or reversible motor 110, which is driven by the automobile battery 111. A switch 112 is provided, preferably mounted on the instrument panel and movable to either of the positions indicated to open or close the windows. The shaft 113 of the motor carries a worm 114 which is in mesh with the teeth of the gear segment 24. The motor 110 is preferably of the type which slips so as to prevent the window 4 from bumping against the door frame at the top and bottom of the window movement.

A power-driven arrangement, similar to that shown in Fig. 17, may be utilized for the purpose of simultaneously regulating all of the windows of a bus, as shown in Figs. 18 and 18a.

For this purpose, a reciprocable bar 115 is provided, which has secured thereto at points spaced to correspond with the spacing of the windows 4', racks 116, the position of which may be adjusted along the bar 115. These racks are in mesh with gear segments 24', rotation of which causes the windows to be raised or lowered in the manner which has been described.

Reciprocation of the bar 115 for the purpose of regulating the windows is effected by means of a power unit 117, which may be an electric motor, an air cylinder, a hydraulic cylinder, or a vacuum cylinder, and the operation of which is controlled by the bus driver by control means readily accessible to him, such as a push button, switch, etc. If desired, the bar 115 may be reciprocated by a manually-operated lever or crank, accessible to the bus driver.

The aforesaid arrangement readily lends itself to a novel system of ventilating busses, in which an air intake, indicated at 118 receives air from the outside of the bus, and such air is then circulated through the bus and is exhausted through the window openings by a siphoning action caused by the rush of air past the windows.

In Figs. 19, 20, 21, 22 and 23 of the drawings, I have shown a modification of the invention in which the swinging window 7 is regulated independently of the window 4.

Referring to these figures of the drawings, it will be seen that the plate 36' has secured to the upper end thereof a U-shaped mounting member 120, having legs 121 and 122 provided respectively with circular openings 123 and 124 which are in axial alignment with each other.

Secured, as by a push fit, in the opening 124, is a cup 125 which has mounted centrally therein a reciprocally movable pin 126 having an enlarged head 127. The cup 125 has a flared lip 128. A compression coil spring 129 is disposed within the cup 125 and bears against the head 127 of the pin 126. Similarly secured, as by a push fit, in the opening 123, is a sleeve 130 having a flared lip 131, similar to the lip 128.

The drive shaft 132 is secured to the window 7 in the same manner that the shaft 13 (Fig. 1) is secured to said window, but in this case, the shaft is provided with a circular portion which extends through the sleeve 130, a portion directly below the circular portion having helical gear teeth 133, and a lower end 134 of considerably smaller diameter than the helical gear portion 133. An annular recess 135 is formed in the shaft between the portions 133 and 134 thereof. The lower end 134 of the shaft bears directly upon the head 127 of the pin 126 and compresses the spring 129, as clearly shown in Fig. 19, the spring exerting an upward pressure against the window 7 which acts to maintain the pivot 9 in its conical seat 10.

A worm shaft 136 is provided having a worm 137 at one end thereof which is in mesh with the helical gear teeth 133. This worm shaft is retained in position in the member 120 by means of a bushing or sleeve 138, one end of which bears against one end of the worm 137 and the other end of which is provided with a flange 139, which bears against the inner face of the plate 36' and is secured to the latter as well as to the member 120 by means of screws 139a. The bushing 138 serves as a bearing for the shaft 136. The worm 137 is retained in mesh with the gear teeth 133 by means of a retainer member having an arcuate portion 140 which embraces and provides a bearing for the worm and arms 141 which are rigidly secured to the legs 121 and 122 of the mounting 120.

The shaft 136 is maintained against axial displacement by means of a lock nut 142 which is secured to a threaded portion of the shaft 136, being locked against rotation relatively to said shaft by means of a washer 143. Before securing the nut 142 to the shaft 136, the washer 143 is slid over the threaded portion of the shaft and against the flange 139, as shown in Fig. 21. To insure against rotation of the washer 143 relatively to the shaft, the washer is provided with an inwardly extending lug 144, which extends into a slot or keyway 145 which extends longitudinally of the shaft 136. After the nut 142 has been moved to the desired position, that is to say, into contact with the washer 143, a lug 146, with which the washer is provided, is bent into engagement with one of the side faces of the nut 142, thereby locking the nut against rotation relatively to the shaft 136.

The shaft 136 is driven by means of a crank handle 147.

In mounting the window 7, the shaft 132 is inserted in the opening 15, through the sleeve 130 and into the cup 125, the flared lips 128 and 131 facilitating entry of the shaft through the sleeve and into the cup. The assembly is further facilitated by virtue of the fact that the helical gear teeth 133 have a thread angle of less than 5°, and therefore readily enter the spaces between the convolutions of the worm 137. Moreover, the lower end 134 of the shaft 132, being of considerably smaller diameter than the diameter of the portion 133 of the shaft, readily passes the teeth of the worm 137. After the head 127 of the pin 126 has been depressed to a sufficient extent, the window is moved upwardly sufficiently to cause the pivot 9 to enter the seat 10, and the window is resiliently maintained in its mounted position by means of the spring 129.

In order to prevent unauthorized removal of the window from the door, a set screw 148 is provided having a dog point 149. The screw is threadedly mounted in a lug 150 which is welded to the retainer 140, the dog point 149 being disposed in the recess 135 of the shaft 132.

When it is desired to remove the window 7 for repair or replacement purposes, the dog point 149 of the set screw is withdrawn from the recess 135, after which the window is pushed downwardly sufficiently to withdraw the pivot 9 from its seat 10, and the window can then be readily removed from the door.

It will be readily apparent that the mechanism shown in Figs. 19 to 23 inclusive can be quickly and easily substituted for the dual control mechanism of the previously described forms of the invention, where independent operation of the windows 4 and 7 is desired.

It is thus seen that I have provided ventilating systems for vehicles which fulfil all of the stated objects of the invention in a manner which is economical, as well as rugged and durable.

It is to be understood that the forms of my invention herewith shown and described, are to be taken as preferred examples of the same, and that various changes in the shape, size and arrangement of parts may be resorted to, without departing from the spirit of my invention, or the scope of the subjoined parts.

This application is a continuation-in-part of my copending applications, Serial Nos. 551,406; 553,390 and 564,071 on which Patents 2,479,833, dated August 23, 1949; 2,422,830, dated June 24, 1947; and 2,448,796, dated September 7, 1948, have been granted.

Having thus described my invention, I claim:

1. In combination with an automobile door having a window, a member rigidly mounted on said door and having a shaft therein, a plate for supporting said window, yieldable fastening means securing said window to said plate, crank-operated means for rotating said plate about said shaft to raise or lower said window, said member having serrations arranged concentric with said shaft, a trigger pivotally mounted on said plate, and means responsive to a straight downward push applied to said window for swinging said trigger into locking engagement with said serrations, whereby to lock said window against further downward movement.

2. In an automobile window assembly, the combination of a window normally movable in a vertical plane, a movable window support member disposed adjacent the lower edge of said window, securing means yieldably maintaining said window in juxtaposition to said support member whereby said window is rockable relatively to said support member, and means responsive to rocking movement of said window for locking said support member against downward movement, said means comprising an element mounted on said support member and movable into locked engagement with a fixed portion of said automobile in response to relative movement between said window and said support member.

3. In an automobile window assembly, the combination of a window pivotally movable in a vertical plane, a rotatable window support member disposed adjacent the lower edge of said window, securing means yieldably maintaining said window in juxtaposition with said support member whereby said window is rockable relatively to said member, and means responsive to rocking movement of said window for locking said window against sustained downward movement, said means comprising an element mounted on said support member and movable into locked engagement with a fixed portion of said automobile in response to relative movement between said window and said support member.

4. In an automobile window assembly, the combination of a window movable in a vertical plane, a movable window support member, securing means yieldably maintaining said window in juxtaposition with said support member whereby said window is rockable relatively to said support member, actuating means associated with said support member for effecting movement thereof, and locking means responsive solely to relative movement between said window and said support member for releasably securing said support member against movement.

5. In an automobile window assembly, the combination of a window support member mounted for pivotal movement in a vertical plane, a window, having its lower edge resiliently secured to said support member, means associated with said support member for effecting rotation thereof and corresponding movement of said window, and locking means linked to said window and to said support member and having an element thereof adapted to operatively engage a fixed portion of said automobile in response to movement of said window relatively to said support member.

6. In an automobile window assembly, the combination of a movable window support member, a window having its lower edge seated on said member, securing means yieldably maintaining said window in juxtaposition with said support member, actuating means associated with said support member to cause movement thereof and corresponding raising or lowering of said window, a trigger pivotally secured to said support member and having a portion thereof adapted to engage a fixed element on said automobile, and a link, having one end thereof secured to said window and having the other end thereof secured to said trigger, whereby to pivot said trigger into locking engagement with said fixed element of said automobile in response to relative movement between said window and said support member.

7. A combination, as defined in claim 6, in which said actuating means comprise a crank-operated gear train.

8. A combination, as defined in claim 6, in which said securing means comprises a fastening element extending through said support member into engagement with said window and a spring engaging said fastening element in a manner to resiliently maintain said window in abutment with said support member.

9. A combination, as defined in claim 6, in which said fixed element is provided with a series of serrations thereon adapted to cooperate with said trigger.

10. A combination, as defined in claim 6, in which said fixed element is coextensive with the path of movement of said trigger.

11. In an automobile window assembly, the combination of a rotatable gear sector, means for rotating said gear sector, a window surmounting said gear sector and resiliently secured thereto whereby said window is adapted to raise or lower in response to movement of said gear sector, and lever means associated with said gear sector and said window and adapted to lock said gear sector against movement in response to downward movement of said window relatively to said gear sector.

12. In an automobile window assembly, the combination of a movable window support member, a window surmounting said member, securing means yieldably connecting said window to said support member, for concurrent movement therewith, a movable electrical contact element mounted on said movable support member, an electrical contact member engageable with said contact element at all positions of said support member, and means actuated by movement of said window relatively to said support member for moving said electrical contact element into contact with said electrical contact member whereby to close an electrical alarm circuit.

13. In an automobile window assembly, the combination of a movable window support member, a window surmounting said member, securing means yieldably connecting said window to said support member whereby said window is rockable relatively to said support member, actuating means for causing movement of said support member, and means responsive to rocking movement of said window relatively to said support member for effecting the closing of an electrical alarm circuit.

14. A combination, as defined in claim 13, in which said last-named means comprises a trigger pivotally secured to said support member, and lever means connected to said window and adapted to rotate said trigger into circuit closing position.

15. A combination, as defined in claim 14, in which said trigger is disposed in operative relationship to a fixed member of the automobile whereby to simultaneously lock said support member against movement.

LEO S. GREENMUN.

REFERENCES CITED

The following references are of record in the file of this patent:

UNITED STATES PATENTS

| Number | Name | Date |
|---|---|---|
| 421,339 | Wollensak | Feb. 11, 1890 |
| 609,640 | Wartzenluft | Aug. 23, 1898 |
| 944,494 | Noel | Dec. 28, 1909 |
| 1,153,314 | Keeler | Sept. 14, 1915 |
| 1,358,249 | Sanberg | Nov. 9, 1920 |
| 1,412,569 | Nicholson | Apr. 11, 1922 |
| 1,563,391 | Nicholson | Dec. 1, 1925 |
| 2,034,202 | Paton | Mar. 17, 1936 |
| 2,053,854 | Vincent | Sept. 8, 1936 |
| 2,085,106 | Limanowski | June 29, 1937 |
| 2,108,326 | Carnahan | Feb. 15, 1938 |
| 2,122,963 | Susor | July 5, 1938 |
| 2,145,659 | Lane | Jan. 31, 1939 |
| 2,145,668 | Taylor | Jan. 31, 1939 |
| 2,152,055 | Kegler | Mar. 28, 1939 |
| 2,164,342 | Morrison | July 4, 1939 |
| 2,201,004 | Chandler | May 14, 1940 |
| 2,261,482 | Myers | Nov. 4, 1941 |
| 2,292,964 | Nicholson | Aug. 11, 1942 |
| 2,331,260 | Wiseman | Oct. 5, 1943 |
| 2,422,830 | Greenmun | June 24, 1947 |
| 2,448,796 | Greenmun | Sept. 7, 1948 |
| 2,479,833 | Greenmun | Aug. 23, 1949 |